United States Patent [19]

Iida et al.

[11] Patent Number: 4,864,622
[45] Date of Patent: Sep. 5, 1989

[54] VOICE RECOGNIZING TELEPHONE

[75] Inventors: Masayuki Iida, Yawata; Shinichi Tsurufuji, Nara, both of Japan

[73] Assignee: Sanyo Electric Co., Ltd., Osaka, Japan

[21] Appl. No.: 114,211

[22] Filed: Oct. 28, 1987

[30] Foreign Application Priority Data

Oct. 31, 1986 [JP] Japan .................................. 61-261105
Nov. 4, 1986 [JP] Japan .................................. 61-262288

[51] Int. Cl.⁴ ............................................. G10L 5/06
[52] U.S. Cl. ...................................... 381/41; 381/42; 381/43; 379/355; 364/513.5
[58] Field of Search ................................ 379/354-356; 381/41-43; 364/513.5

[56] References Cited

U.S. PATENT DOCUMENTS

| | | | |
|---|---|---|---|
| 4,348,550 | 9/1982 | Pirz et al. | 379/360 X |
| 4,624,011 | 11/1986 | Watanabe et al. | 381/43 |
| 4,644,107 | 2/1987 | Clowes et al. | 379/355 X |
| 4,651,289 | 3/1987 | Maeda et al. | 381/43 X |
| 4,718,095 | 1/1988 | Asakawa et al. | 381/43 |
| 4,802,224 | 1/1989 | Shiraki et al. | 381/41 |

Primary Examiner—Patrick R. Salce
Assistant Examiner—Emanuel T. Voeltz
Attorney, Agent, or Firm—Darby & Darby

[57] ABSTRACT

Correction of a voice reference pattern of a so-called voice recognizing telephone having a voice recognizing function, whereby the frequency of voices inputted before the voices are correctly recognized is measured by the counter, the voice reference pattern may be corrected by the voice pattern correcting circuit in accordance with the voice inputting frequency, so that a practical voice recognizing telephone which is capable of high recognition ratio may be provided.

26 Claims, 2 Drawing Sheets

VOICE RECOGNIZING TELEPHONE

BACKGROUND OF THE INVENTION

The present invention generally relates to the correction of a voice reference pattern of a so-called voice recognizing telephone having a voice recognizing function.

Conventionally, various telephones which have applied a voice recognizing function to the dial operation are taken into consideration, as disclosed in the paper of "A voice activated telephone" written by Masanori MIYATAKE et al., issued on pages 468 to 473 of IEEE Transactions on Consumer Electronics, Vol. CE-32, No. 3, August 1986. The faithful voice pattern to the normal transmission voice is not always registered because of surrounding noises or psychological factors during the registration of the voice reference pattern. Accordingly, in order to retain the high recognition ratio, the correcting function is required. The fact is that the conventional telephone of this kind does not have a correction function or it has a simple function only if it has a correction function, so that the high recognition ratio cannot be maintained, as mentioned in Japanese Patent Publication (unexamined) No. 62-105558.

SUMMARY OF THE INVENTION

Accordingly, an object of the present invention is to remove a problem that the high recognition ratio cannot be maintained, because a function is not provided of correcting the problem, i.e., correcting the voice reference pattern registered already in the voice recognizing telephone or only a simple correcting function is provided.

For the solution of the conventional problem, the present invention provides a voice recognizing telephone, which is composed of a voice recognizing circuit for extracting the characteristics of the inputted voices to identify and to decide them, a voice reference pattern's memory for accommodating the voice reference patterns, a voice pattern correcting circuit which is connected with the voice recognizing circuit and the voice reference pattern's memory to correct the voice reference pattern, a counter which is connected with the voice pattern correcting circuit to count how often the voices have been inputted at the voice recognition, a control circuit for controlling the whole. Thus, in the telephone of the present invention, the frequency of the voices inputted during the voice recognition is counted by the counter, the voice reference pattern is corrected by the voice pattern correcting circuit in accordance with the voice input frequency, so that the voice reference pattern may be corrected by the extent of the recognition.

Also, the present invention is a voice recognizing telephone which is composed of a talking timer which monitors the talking condition to measure the time period from the talking start, a voice recognizing circuit which extracts the characteristics of the inputted voices to identify and to decide them, a voice reference pattern's memory for accommodating the voice reference patterns, a voice pattern correcting circuit which is connected with the voice recognizing circuit and the voice reference pattern's memory to correct the voice reference pattern, a control circuit for controlling the whole. Thus, in the telephone of the present invention, the voice reference pattern is corrected by the use of the voice pattern correcting circuit in accordance with the degree of similarity between the input voice pattern and the voice reference pattern, so that the high recognition ratio may be maintained.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
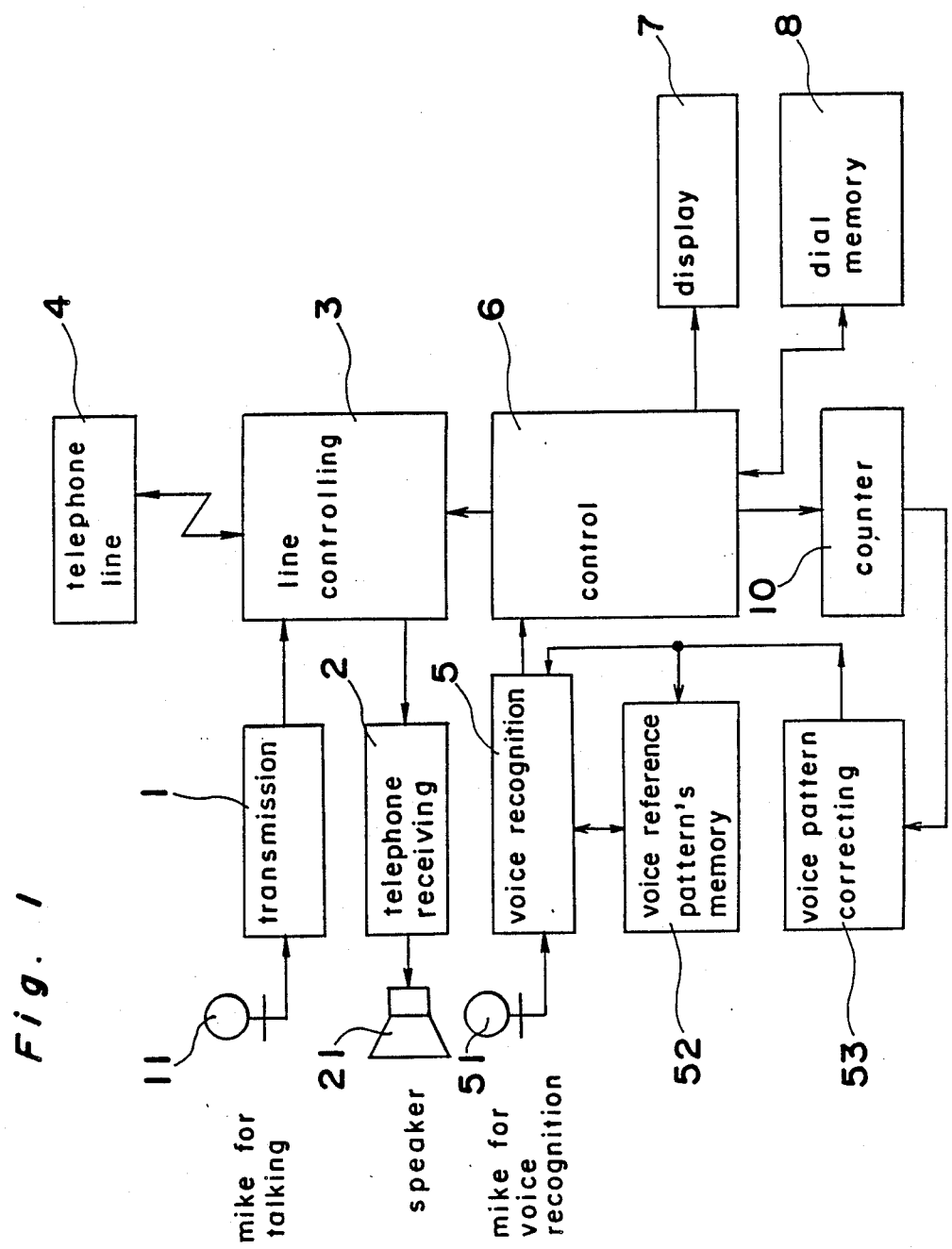
FIG. 1 is a block diagram of a voice recognizing telephone in a first embodiment of the present invention.

Before the description of the present invention proceeds, it is to be noted that like parts are designated by like reference numerals throughout the accompanying drawings.

Referring now to the drawings, there is shown in FIG. 1 one embodiment of the present invention, wherein a mike 11 for transmission use is connected with a telephone line 4 by way of a transmitting circuit 1 for converting voices into electric signals and a line controlling circuit 3. A speaker 21 for converting into the actual voices the voices of a talking party provided with electric signals, and a telephone receiving circuit 2 for handling the electric signals are also connected with the telephone line 4 through the line controlling circuit 3.

A voice recognizing circuit 5 patterns the voices inputted from the mike 51 for voice recognizing use and compares them with the voice reference patterns accommodated previously within a voice reference pattern's memory 52 and conveys the recognition results into a control circuit 6. The control circuit 6 instructs the necessary actions to each circuit in accordance with the results. A voice pattern correcting circuit 53 which has received the instructions of the control circuit 6 is adapted to correct the voice reference pattern.

In the embodiment shown in FIG. 1, mikes 11 and 51 are provided separately for transmission use and voice recognition use, and the voices are taken in by the same one mike to half way branch off the voices converted into electric signals, so that it may be used in forms suitable for the respective uses. Telephone numbers, redial numbers, and so on, which correspond to the voice reference patterns of the party names accommodated within the voice reference pattern's memory 52, are accommodated in a dial memory 8. A displaying circuit 7 notifies the user of the telephone condition or information. A counter 10 is connected with the control circuit 6 and the voice pattern correcting circuit 53 to measure the voice-inputted frequency in the voice-inputting (recognizing) operation.

The actual operation example is as follows. First, the registration of the voice necessary for the voice recognition is performed. Specifically, controlling commands such as "telephone" for starting the telephone function, "end" for completing the function, "OK" for confirmation when the inputted voices are correct, and parties for dialing operation such as "Sanyo", "Tsurufuji" or the like in spoken voices are patterned, and are accommodated within the voice reference pattern's memory 52 as the voice reference pattern.

The dial operation by the voice input (recognition) is as follows. The controlling command for starting the telephone function, "telephone" is spoken. Continuously, the name of the party to be dialed, "Sanyo" is spoken. The user looks at the displaying circuit 7 to confirm whether or not the name of the party, "Sanyo", has been correctly recognized in voice, and speaks a confirmation word "OK" if the voice is correct. On the other hand, when such a result as the user expected is not displayed, i.e., "Tsurufuji" is displayed, the user speaks "Sanyo" again, with the contents of the counter 10 being counted up. When the name of the party is not correctly recognized even with the repeated voices spoken, "Sanyo" is spoken further again to further count up the contents of the counter 10. When the correct recognition results come out, the operator speaks a confirmation word "OK" to stop the counting of the counter 10. In the present embodiment, the displaying circuit 7 is used to confirm the voice recognition results, and the other means such as synthesized voices may be used for confirmation.

By the series of operations, the control circuit 6 takes out the telephone number of the "Sanyo" from the dial memory 8 to send it into the line controlling circuit 3. The line controlling circuit 3 sends this telephone number into the telephone line 4 for the talking operation with the party. At this time point, the voice pattern correcting circuit 53 knows the measured results of the counter 10 to correct the voice reference pattern of the voices corresponding to the transmitted telephone number by the correction rule determined in accordance with this result.

The corrected rule is as follows in one example. Assume that the counter 10 has started counting from the initial value "0", and the voice of the party name such as "Sanyo" is correctly recognized with the first spoken voice. When the confirmation word "OK" has been recognized continuously, the contents of the counter 10 remains "0". When it has been correctly recognized with the second spoken voice, the contents thereof remain "1". When it has been correctly recognized with the third spoken voice, the contents thereof remain "2", with the contents increasing sequentially in accordance with the spoken number.

When the contents of the counter 10 is "0", the voice reference pattern is not corrected in consideration that the similarity degree between the input voice pattern and the voice reference pattern is high, that is, the voice reference pattern is an ideal. However, when the contents thereof is "1", the voice reference pattern is somewhat corrected by the input voice pattern, when the contents thereof is "2", the input voice pattern and the voice reference pattern are corrected in the averaged form. When the contents thereof is "3", the voice reference pattern is replaced by the input voice pattern on the estimation that the similarity degree thereof is low, that is, it is improper for the voice reference pattern.

In the present embodiment, the operation is an automatic pattern correcting operation, i.e., the operation has nothing to do with the user's desire. The pattern correcting means through a switch or the like, which is used by the user, may be used at the same time. It is to be noted that the counter 10 feeds the measured result into the voice pattern correcting circuit 53 to return the count contents to the initial value "0" for queuing operation. As described hereinabove, according to the present invention, the frequency of voices inputted before the voices are correctly recognized is measured by the counter. The voice reference pattern may be corrected by the voice pattern correcting circuit in accordance with the voice inputting frequency so that a practical voice recognizing telephone which is capable of high recognition ratio may be provided.

Figure 2:
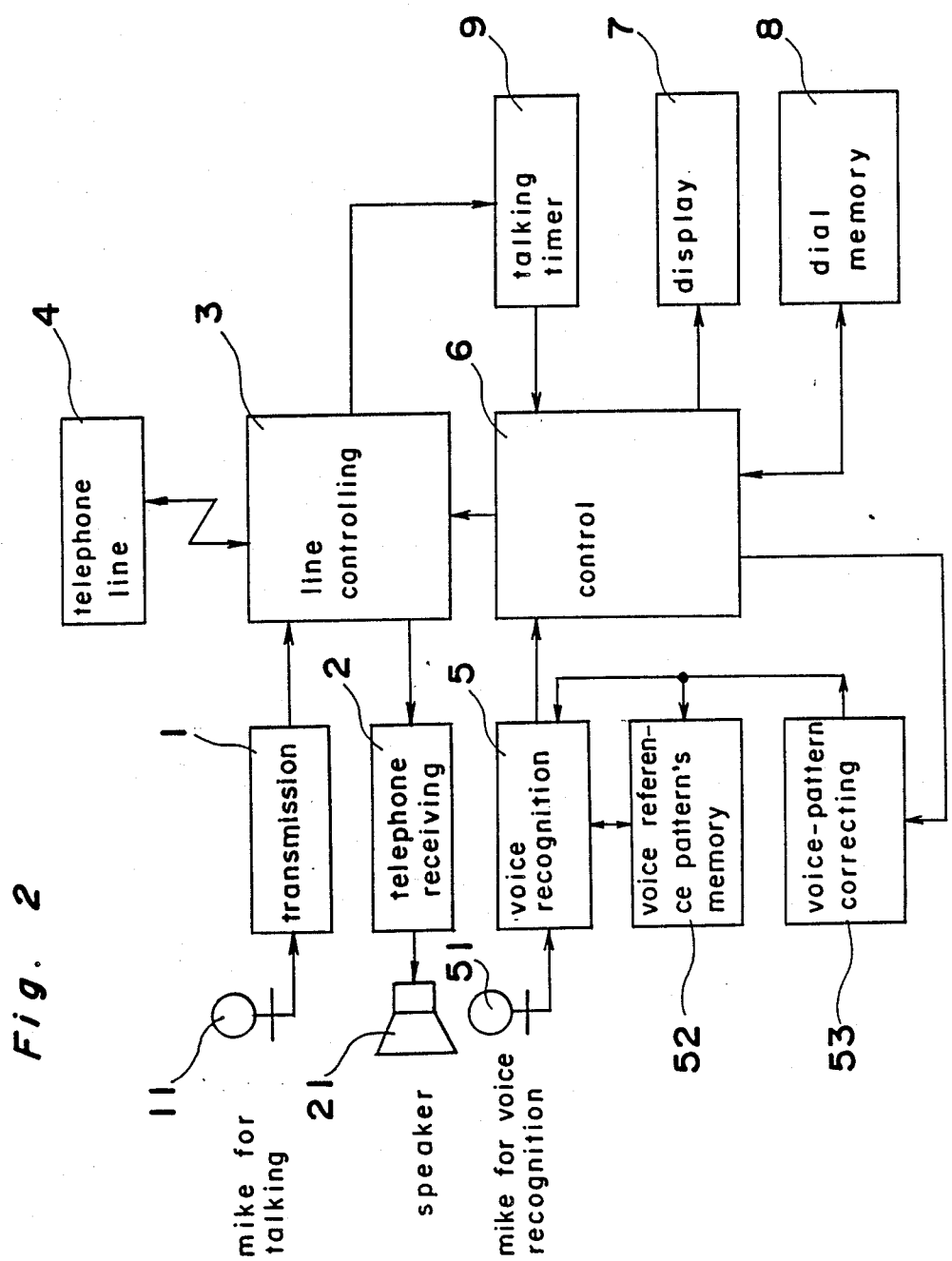
FIG. 2 is a block diagram of a voice recognizing telephone in a second modified embodiment of the present invention.

FIG. 2 shows the other embodiment of the present invention, wherein it is to be noted that like parts in FIG. 1 are designated by like reference numerals throughout the accompanying drawings so as to omit the description thereof. The difference between the second embodiment of FIG. 2 and the first embodiment of FIG. 1 is that the counter 10 measures the frequency of the voices inputted during the voice recognition, a talking timer 9 is provided between the line controlling circuit 3 and the control circuit 6 to monitor the talking condition to measure the time from the talking start.

The actual operation example is as follows. First, the registration of the voice necessary for the voice recognition is performed. Specifically, controlling commands such as "telephone" for starting the telephone function, "end" for completing the function, "OK" for confirmation when the inputted voices are correct, and parties for dialing operation such as "Sanyo", "Tsurufuji" or the like in spoken voices are patterned, and are accommodated within the voice reference pattern's memory 52 as the voice reference pattern.

Accordingly, the dial operation by the voice input (recognition) is as follows. The controlling command "telephone" for starting the telephone function is spoken, and continuously the party name "Sanyo" to be dialed is spoken. The operator looks at the displaying circuit 7 to confirm that the party name "Sanyo" has been correctly recognized in voice and speaks the confirmation word "OK".

In the present embodiment, the displaying circuit 7 is used to confirm the voice recognition results, and the other means such as synthesized voices may be used for confirmation.

By this series of operations, the control circuit 6 takes out the telephone number of the "Sanyo" from the dial memory 8 to send it into the line controlling circuit 3, the line controlling circuit 3 sends this telephone number to the telephone line 4. At the same time with it, the talking timer 9 starts the time measuring operation. The talking timer 9 conveys to the control circuit 6 that the predetermined time period such as three minutes have past, the control circuit 6 corrects the voice reference pattern of the voices corresponding to the transmitted telephone number in accordance with the given correction rule.

The correction rule of this embodiment is as follows. The voice recognition patterns the voices inputted from the mike 51 for voice recognition use by the voice recognition circuit 5 and compares it with the voice reference patterns accommodated previously within the voice reference pattern's memory 52 and provides the result. When a score which means the degree of similarity between the input voice pattern and the voice reference pattern is high (is very similar) at this time, the voice reference pattern is not corrected at all with the voice reference pattern being ideal. Conversely, when the score is low (is similar, but is not by much), the voice reference pattern is corrected with the voice reference pattern being not ideal. Also, the correcting degree may be varied by the score.

In the second embodiment, the operation is an automatic pattern correcting operation, i.e., it has nothing to do with the user's desire. The pattern correcting means through a switch or the like, which is selected as desired by the user, may be used at the same time. It is to be noted that the talking timer 9 monitors the talking condition and returns the predetermined time into the initial value (for example, zero) after the completion of the talking for queuing operation.

As described hereinabove, according to the second embodiment, when the time measuring operation by the talking timer has passed the given time, the talking is realized, namely, the name of the party inputted in voice for dialing operation is correctly recognized. The voice reference pattern may be corrected by the use of the voice pattern correcting circuit though by the recognizing score at that time. Thus, a practical voice recognizing telephone which is capable of maintaining the high recognition ratio may be provided.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A voice recognition telephone arrangement, comprising:
   means for accommodating in memory input voice patterns indicative of inputted voices and for accommodating in memory voice reference patterns necessary for identifying the inputted voices;
   voice recognition means for identifying said input voice patterns with respect to said voice reference patterns and for producing a voice recognition result;
   means for dialing a telephone number corresponding to said voice recognition result in response to said voice recognition means; and
   correcting means for correcting said voice reference patterns with said input voice patterns that are identified by said voice recognition means based on degrees of similarity between said input voice patterns and said voice reference patterns.

2. An arrangement according to claim 1, wherein said accommodating means includes a dial memory for accommodating in memory telephone numbers corresponding to said voice reference patterns.

3. An arrangement according to claim 1, further comprising:
   a line controlling circuit for connecting a transmitting circuit and a telephone receiving circuit with a telephone line, said dialing means being connected to said telephone receiving circuit, said telephone receiving circuit receiving the inputted voices.

4. An arrangement according to claim 1, further comprising:
   control means for controlling all of said accommodating means, said voice recognition means, said dialing means and said correcting means so that said correcting means corrects said voice reference patterns after said dialing means dials the telephone number corresponding to said result.

5. An arrangement according to claim 1, wherein said voice recognition means includes means for deciding said degrees of similarity between said input voice patterns and said voice reference patterns based on a number of inputted voices necessary before said dialing means dials the telephone number corresponding to said result.

6. An arrangement according to claim 5, further comprising:
   counter means for counting up to said number of inputted voices necessary, said deciding means being responsive to said counter means.

7. An arrangement according to claim 4, wherein said voice recognition means includes means for deciding said degrees of similarity between said input voice patterns and said voice reference patterns based on a completion of a measured time interval when said dialing means dials the telephone number corresponding to said result.

8. An arrangement according to claim 7, further comprising:
   timer means for monitoring a talking condition by timing said interval as an interval commencing when talking starts and lasting until said dialing means commences dialing the telephone number, said deciding means being responsive to said timer means.

9. An arrangement according to claim 4, wherein said voice recognition means includes means for deciding said degrees of similarity between said input voice patterns and said voice reference patterns based on a frequency of the inputted voices before said dialing means dials the telephone number corresponding to said result.

10. An arrangement according to claim 9, further comprising:
    means for measuring said frequency, said deciding means being responsive to said measuring means.

11. An arrangement according to claim 1, wherein said voice recognition means extracts characteristics of said inputted voices necessary for identification, said input voice patterns being comprised of said characteristics.

12. A method of voice recognition for a telephone, comprising the steps of:
    accommodating in memory input voice patterns indicative of inputted voices and voice reference patterns necessary for identifying the inputted voices;
    voice recognizing by identifying the input voice patterns with respect to the voice reference patterns;
    producing a voice recognition result after the step of identifying;
    dialing a telephone number corresponding to the voice recognition result in response to the step of producing; and
    correcting the voice reference patterns with the input voice patterns that are identified by the step of voice recognizing based on the degrees of similarity between the input voice patterns and the voice recognition patterns, the step of correcting taking place in response to the step of dialing.

13. A method according to claim 12, wherein the step of accommodating also includes accommodating in memory telephone numbers corresponding to the voice reference patterns.

14. A method according to claim 12, wherein the step of correcting includes correcting the voice reference patterns after completion of the step of dialing the telephone number corresponding to the result.

15. A method according to claim 12, wherein the step of voice recognizing includes deciding the degrees of similarity between the input voice patterns and the voice reference patterns based on a number of inputted voices necessary before the step of dialing the telephone number corresponding to said result takes place.

16. A method according to claim 15, further comprising the step of:
  counting up to the number of inputted voices necessary, said deciding means being responsive to the step of counting.

17. A method according to claim 12, wherein the step of voice recognizing includes deciding the degrees of similarity between the input voice patterns and the voice reference patterns based on a completion of a measured time interval in response to the step of dialing the telephone number corresponding to said result.

18. A method according to claim 17, further comprising the step of:
  monitoring a talking condition by timing the measured time interval as an interval commencing when talking starts and lasting until the step of dialing means commences, the step of deciding being responsive to said timer means.

19. A method according to claim 12, wherein the step of voice recognizing includes a step of deciding the degrees of similarity between the input voice patterns and the voice reference patterns based on a frequency of the inputted voices before the step of dialing the telephone number corresponding to said result takes place.

20. A method according to claim 19, further comprising the step of:
  measuring the frequency, the step of deciding being responsive to the step of measuring.

21. A method according to claim 12, wherein the step of voice recognizing extracts characteristics of the inputted voices necessary for identification, the input voice patterns being comprised of the characteristics.

22. A voice recognition arrangement, comprising:
  means for accommodating in memory input voice patterns indicative of imputted voices and for accommodating in memory voice reference patterns necessary for identifying the inputted voices;
  means for determining degrees of similarity between said input voice patterns and said voice reference patterns;
  voice recognition means responsive to said determining means for identifying said input voice patterns with respect to said voice reference patterns and for producing a voice recognition result; and
  correcting means responsive to said result being produced by said voice recognition means for correcting said voice reference patterns with said input voice patterns based on a degree of similarity between said input voice patterns and said reference voice patterns.

23. An arrangement according to claim 22, wherein said correcting means includes means for determining said degree of similarity.

24. An arrangement according to claim 23, wherein said determining means determines said degrees of similarity by measuring a time interval of talking before said voice recognition result is produced.

25. An arrangement according to claim 23, wherein said determining means determines said degrees of similarity by counting a number of inputted voices necessary before said voice recognition result is produced.

26. An arrangement according to claim 23, wherein said determining means determines said degrees of similarity by measuring a frequency of the inputted voices before said voice recognition result is producted.

* * * * *